United States Patent
Ghanem

(10) Patent No.: US 7,696,698 B2
(45) Date of Patent: Apr. 13, 2010

(54) LEDS TRICOLOR POWER SIGNAL

(75) Inventor: Mohamed Ghanem, Pierrefonds (CA)

(73) Assignee: Lumination LLC, Cleveland, OH (US)

( * ) Notice: Subject to any disclaimer, the term of this patent is extended or adjusted under 35 U.S.C. 154(b) by 276 days.

(21) Appl. No.: 12/006,143

(22) Filed: Dec. 31, 2007

(65) Prior Publication Data

US 2009/0167186 A1   Jul. 2, 2009

(51) Int. Cl.
 *H05B 37/00* (2006.01)
(52) U.S. Cl. ............... 315/123; 315/119; 315/159; 315/308
(58) Field of Classification Search .......... 315/307, 315/308, 119, 121, 123, 127, 128, 149, 155, 315/159, 156, 157, 158; 340/907, 908, 515.4, 340/309.16
See application file for complete search history.

(56) References Cited

U.S. PATENT DOCUMENTS

| | | | |
|---|---|---|---|
| 3,946,209 A * | 3/1976 | Jekat ................... | 377/55 |
| 6,054,932 A | 4/2000 | Gartner et al. | |
| 6,380,686 B1 * | 4/2002 | Kim et al. ............ | 315/169.2 |
| 6,466,135 B1 | 10/2002 | Srivastava et al. | |
| 6,474,839 B1 | 11/2002 | Hutchison | |
| 6,555,958 B1 | 4/2003 | Srivastava et al. | |
| 6,567,010 B1 | 5/2003 | Lin et al. | |
| 6,693,556 B1 | 2/2004 | Jones et al. | |
| 6,943,698 B2 | 9/2005 | Jones et al. | |
| 7,102,538 B2 | 9/2006 | Chen | |
| 7,321,191 B2 | 1/2008 | Setlur et al. | |
| 7,518,319 B2 * | 4/2009 | Konno et al. ......... | 315/291 |
| 2004/0036629 A1 | 2/2004 | Jones et al. | |
| 2006/0039150 A1 | 2/2006 | Mayer et al. | |
| 2006/0091778 A1 | 5/2006 | Setlur et al. | |
| 2007/0114562 A1 | 5/2007 | Radkov et al. | |

FOREIGN PATENT DOCUMENTS

| | | |
|---|---|---|
| EP | 1286321 A1 | 2/2003 |
| WO | WO0003370 A1 | 1/2000 |
| WO | WO0189001 A2 | 11/2001 |
| WO | WO2006050232 A1 | 5/2006 |
| WO | WO2006132517 A1 | 12/2006 |
| WO | WO2007062169 A2 | 5/2007 |

* cited by examiner

*Primary Examiner*—David Hung Vu
(74) *Attorney, Agent, or Firm*—Fay Sharpe LLP

(57) ABSTRACT

A signal is described herein that provides light output for automotive, rail, ship traffic and/or illumination control that includes a light emitting diode (LED) array, wherein the LED array includes three groups of disparate colored LEDs. A power supply unit provides independent power to each of the three LED groups. Each LED group power supply unit includes an input controlled switch connected to a power line to provide power to the LED array. An input under voltage/over voltage circuit monitors the voltage level of the power line and for enabling and/or disables the input controlled switch according to the voltage level of the power line. A flyback transformer converts the power received from the power line from an alternating or a continuous current signal to a direct current signal output to the LED array. A dummy load draws power additional to the LED array and a dummy load detection circuit monitors the dummy load to insure that the power drawn by the load is greater than or equal to a predetermined threshold. A light out detection circuit monitors the light output of the LED array via an optical sensor.

20 Claims, 9 Drawing Sheets

LEDS TRICOLOR POWER SIGNAL

BACKGROUND

The present exemplary embodiments relate to automotive, rail, ship traffic and illumination signals. They find particular application in conjunction with utilizing light emitting diodes with automotive, rail, ship traffic and illumination signals. One particular application for such an LED automotive, rail, ship traffic and illumination signal is to substitute a three lamp signal into a single integrated signal under one housing. However, it is to be appreciated that the present exemplary embodiment is also amenable to other like applications.

Automotive, rail, ship traffic and illumination signals are employed to regulate motorists and pedestrians via various commands. These commands are provided by various illuminated elements with particular colors and/or shapes that are each associated with an instruction. Elements are conventionally illuminated via incandescent bulbs which use heat caused by an electrical current to emit light. When electrical current passes through a filament (e.g., tungsten), it causes the filament to heat to the point that it glows and gives off light. Such illumination can be covered with a colored lens and/or template to provide a meaningful instruction that can be viewed in a variety of external lighting conditions.

The filament is a resistive element in the incandescent bulb circuit. The amount of current drawn by the filament is proportional to its impedance. This impedance value increases as the temperature of the filament increases. Thus, a conventional lamp has a larger initial current draw which drops in proportion to the increase in the filament impedance. This variation in current draw is known and a predetermined range can be utilized to monitor the lamp operation. As such, a lamp failure condition can be identified based on the amount of current drawn by the filament. In one example, the filament fails (e.g., breaks) causing the impedance to approach an infinite value and the current value to decrease to almost zero. If the current drawn is outside of the predetermined range, a responsive action can be initiated by a current monitor or other control system.

Unlike the incandescent-based lamps, LED-based lamps consist of an array of LED elements, which draw much less power. LED-based lamps have numerous advantages over incandescent lamps, such as greater energy efficiency and a longer lifetime between replacements than conventional signals. Some of the longer lifetime results since a plurality of LEDs are employed, wherein a light can be utilized even if some of the LEDs in the array have failed.

However, there are some drawbacks related to LED signal designs. Current designs require three lamps to fulfill signaling needs utilized with conventional incandescent lamp housings. In addition, current multiple color LED signals are susceptible to color mixing failure due to poor insulation design.

What are needed are systems and methods to provide multi-color signal designs with a single integrated signal to provide uniform light output.

BRIEF DESCRIPTION

In one aspect, a signal provides light output for automotive, rail, ship traffic and/or illumination control that includes a light emitting diode (LED) array, wherein the LED array includes three groups of disparate colored LEDs. A power supply unit provides independent power to each of the three LED groups. Each LED group power supply unit includes an input controlled switch connected to a power line to provide power to the LED array. An input under voltage/over voltage circuit monitors the voltage level of the power line and for enabling and/or disables the input controlled switch according to the voltage level of the power line. A flyback transformer converts the power received from the power line from an alternating or a continuous current signal to a direct current signal output to the LED array. A dummy load draws power additional to the LED array and a dummy load detection circuit monitors the dummy load to insure that the power drawn by the load is greater than or equal to a predetermined threshold. A light out detection circuit monitors the light output of the LED array via an optical sensor.

In another aspect, a tricolor power signal includes an LED array that comprises three groups of LEDs, wherein each group has a disparate color. A power supply unit provides power to each group of the LED array. The power supply unit includes an input controlled switch connected to a power line for receiving power to the LED. An input under voltage/over voltage circuit monitors the voltage level of the power line and enables/disables the input controlled switch according to the voltage level of the power line. A flyback transformer converts the power line from an alternating or continuous current signal to a direct current signal output to the LED array. A monitoring circuit monitors the power delivered to the LED array via the power supply unit. The monitoring circuit includes a light out detection circuit to monitor the light output of the LED array via an optical sensor. A current detection circuit detects a current supplied to the LED array to disable the safeguarding circuit when the current of the LED array reaches a predetermined current level.

In yet another aspect, a method of retrofitting a light signal is employed which includes a plurality of signal heads. Each of the plurality of signal heads is replaced with a single head, wherein the single head utilizes an LED array to provide light output, the LED array is comprised of a plurality of groups wherein each group has disparate color to correlate to each head of the light signal. Each group is connected to a power line via an input controlled switch. The power line voltage level is monitored to enable and disable the signal according to the voltage level of the power line. Power additional to the LED array is drawn via a resistive element to simulate power drawn by the light signal. Light output of the LED array is monitored via an optical sensor or LED current sensor and the input power is disabled if no current flows through the LED array after a predetermined time and/or a light output by the LED array is less than a predetermined threshold light output.

DETAILED DESCRIPTION

In describing the various embodiments of the backlighting system, like elements of each embodiment are described through the use of the same or similar reference numbers.

Figure 1:
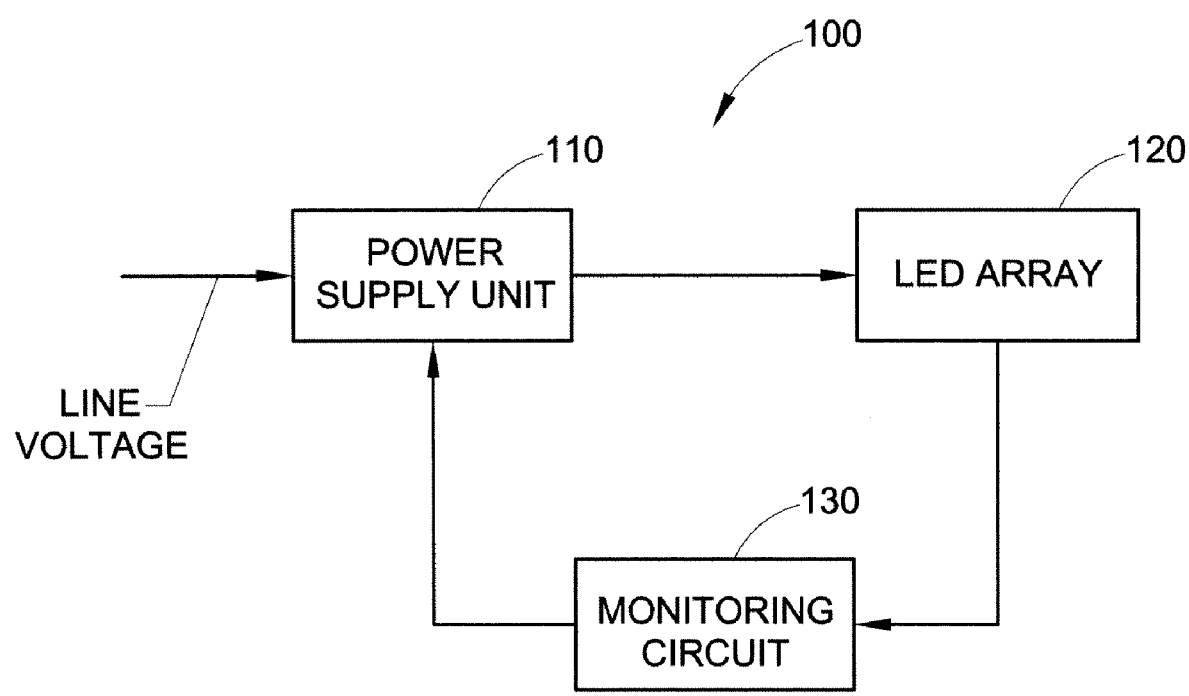
FIG. 1 illustrates a block diagram of a light emitting diode (LED) tricolor power signal, in accordance with an aspect of the subject invention.

FIG. 1 illustrates a block diagram of a light emitting diode (LED) tricolor power signal 100. The LED tricolor power signal 100 can be employed to provide control in a wide variety of applications such as a rail wayside signal, an automotive, rail, ship traffic and illumination signal, a rail searchlight, and/or one or more transit applications, for example. The LED tricolor signal 100 can include a plurality of benefits over conventional means such as high insulation between power circuits for each LED array, a light output detection, a single input connector (e.g., 12-pin) to provide seamless connection to conventional systems, a single output connector (12-pin) from power supplies to LED arrays (for all colors) to eliminate assembly errors, a dummy load (optional), a dummy load detection and a design that meets one or more industry standards, such as a safety integrity level 4.

The LED tricolor signal 100 can be employed to replace three conventional signal heads into a one integrated signal under one housing while maintaining safety and reliability requirements. Three colors can be utilized on a single LED board driven by three disparate power supplies to insure appropriate light output uniformity, fail safe and high insulation between all different colors. In this manner, failure from mechanical vibration is mitigated and cost associated with convention three head systems is reduced.

Utilizing the tricolor power signal 100, LED lights for railway signs can be more robust than conventional systems. Moreover, a safer electronic base is employed that is capable of disabling a defective light under a wide variety potential electronic circuit degradation conditions. To provide power to three LED arrays on a single head, three power supplies are employed. Such design can minimize space requirements since only a single head is required. The tricolor power signal 100 can also provide uniform light intensity and beam angle while eliminating color mixing failure.

The tricolor power signal 100 includes a power supply unit (PSU) 110, an LED light source array 120 and a monitoring circuit 130. In one embodiment, the PSU 110 is representative of a plurality (e.g., three) of power supplies wherein each one drives a particular disparate LED array. The LED array 120 is similarly representative of one or more sets of LEDs that can correlate to a desired color and to the plurality of power supplies represented by the PSU 110.

The monitoring circuit 130 can include a safeguarding circuit 212 (shown in FIG. 2) and a LED current detector circuit 228 (shown in FIG. 2) that monitors the current drawn by the LEDs and turns off permanently the input controlled switch 218 (see FIG. 2) by blowing a FBO fuse when the LEDs current is typically below twenty percent of its nominal value. The PCB LED light source array 120 can be, for example, a matrix of high-brightness 5 mm LEDs configured for redundancy. As will be described further below, the current flowing in the LEDs is regulated by the current sense feedback component 228 to provide constant light flux.

In one embodiment, the LED array 120 includes a pattern of four columns (one group of four LEDs connected in parallel) by twenty-two rows (twenty-two groups connected in series) for the Red LEDs, four by thirty-three for the Yellow LEDs and six by fifteen for the Green and White LEDs. In case of an LED failure in a group over the course of operation, the current is redistributed to the other LEDs of the same group and the signal maintains its light output. In one approach, an increased current level is delivered to the remaining LEDs to compensate for the LEDs that have failed. In this manner, the light output level can be commensurate with that of a group with no LED failures.

Although one embodiment of the LED array 120 is described herein, it is to be appreciated that substantially any number of LEDs, with various colors in disparate configurations can be employed. In one approach, almost four hundred LEDs are arranged and placed on an LED board. Further, the circuits described herein can be arranged in substantially any manner utilizing various types of components (e.g., surface mount, through-hole, etc.). In one example, the tricolor power signal 100 control and power circuits are arranged in four stacked PCBs as depicted in FIGS. 3-6 below.

Figure 2:
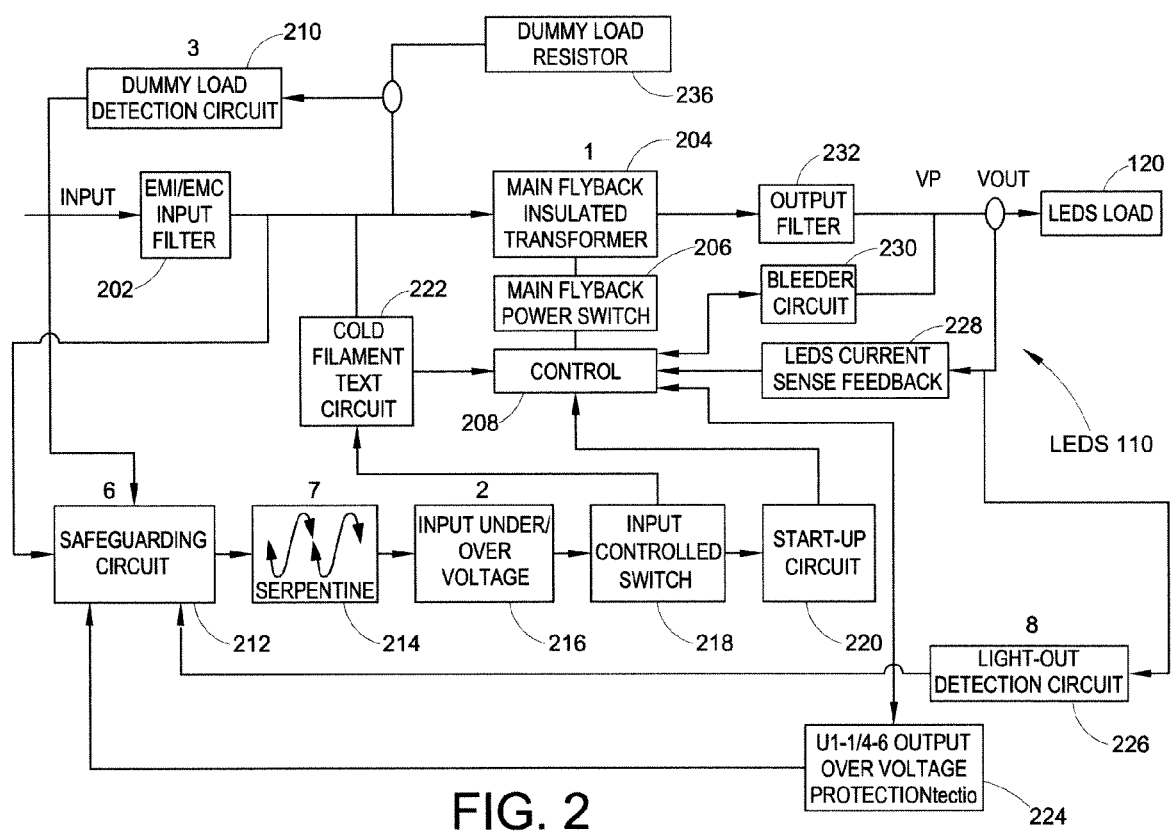
FIG. 2 illustrates a schematic of a power supply unit utilized with the LED tricolor power signal, in accordance with an aspect of the subject invention.

FIG. 2 illustrates a schematic of the PSU 110 from FIG. 1. An input filter 202 receives and filters line power which is received and ultimately delivered to the LED array 120. In this manner, the PSU 110 is protected against internal overload and/or a line voltage surge. The input filter 202 filters the switching frequency of the power stage input current in order to meet the EN55022 conducted and radiated Class B EMC.

In addition or alternatively, a fuse (not shown) can provide protection against overload greater than a predetermined level (e.g., 3.5 A) due to line surge. In one example, the PSU 110 can withstand a surge of 2000 volt 1.2/50 us open circuit voltage and an 8/20 us short circuit current surge having a source impedance of 2 ohms. A varistor (not shown) can clamp the input voltage to a predetermined level (e.g., 10V/120V/220V) when a power surge is detected.

Power is drawn from the input filter 202 by a main flyback insulated transformer 204, a dummy load resistor 236, and the safeguarding circuit 212. The main flyback insulated transformer 204 converts the input power into a form utilized by the LEDs load 120. The dummy load resistor 236 is employed to provide an additional current draw to allow the LED signal 100 to be employed as a replacement for conventional incandescent systems. As known, LED signals draw much less current than conventional systems and such compensation can allow LED signals to be implemented seamlessly as viewed by conventional control systems. The safeguarding circuit 212 is employed to prevent deleterious effects caused by undesired power fluctuations in the PSU 110.

The safeguarding circuit 212 can be employed to force a fuse to blow out when the power drawn by the LED array 120 is lower than a predetermined threshold (e.g., twenty percent of its nominal value). If such a threshold is met, the connection to power will be opened. A time delay circuit can be employed to provide a sufficient delay to the PSU 110 to turn on (e.g., 50 ms to 170 ms) which is and sufficiently short to blow a fuse when the signal 100 is in flashing mode (e.g., 330 ms).

The input current is converted via a main flyback insulated transformer 204 from an input AC or DC power to a constant DC output to power the LED array 120. The main flyback insulated transformer 204 is a switch-mode converter that transforms 10V/120V/240V, AC or DC voltage to a DC current. In this manner, the LED array 120 can emit continuous light with no flicker. A flyback converter topology can be employed to provide specific voltage across the LED array 120 based on a desired LED configuration. Such configuration can vary based on quantity, configuration and/or type of LED employed.

The input under-voltage circuit 216 receives power from the input filter 202 to monitor the line voltage level. In one example, the input under-voltage circuit 216 will activate the input controlled switch 218 to let the power go from the line to the LED's. The safeguarding circuit 212 blows out the fuse to disable the input controlled switch 218 if no current flows through the LED array after a predetermined time when the input controlled switch 218 is activated. Alternatively or in addition, the safeguarding circuit 212 can disable the input power to the LED array if the light output is less than a predetermined threshold.

A serpentine trace 214 can be connected in series with the fuse of the safeguarding circuit 212 to disable the input controlled switch 218 upon physical damage to the PCB (power supply). In one example, the serpentine trace 214 is laid in a pattern to cover substantially the entire surface area of the PCB. Thus, if the PCB is physically damaged, the serpentine trace 214 will be broken and the signal will be disabled. In this manner, the serpentine trace 214 provides an additional safety measure to insure the signal is working properly and is not illuminated erroneously.

An input under voltage circuit 216 receives an input from the power line via the safeguarding circuit 212 to disable the input controlled switch 218 if the power line voltage is less than a predetermined threshold. The input controlled switch 218 can convert a voltage (e.g., 10 V/120V/240V, AC or DC) to a predetermined output constant current to the LED array 120. Railroads safety issue requires a circuit to control the turn-on and turn-off of the LED array 120. The implementation of the input controlled switch 218 of the PSU 110 can provide such protection against an out of range low input voltage. In one embodiment, the input controlled switch 218 has a turn-on feature that monitors the input line voltage. In general, the LED array 120 is turned on at a predetermined voltage level and turned off at another predetermined voltage level. In this manner, the input controlled switch 218 can be designed to turn on when the input line voltage exceeds the minimum turn-on level and turns off below the maximum turn-off level to provide sufficient margins.

A cold filament test circuit 222 between the input controlled switch 218 and the input power. The cold filament test circuit 222 is connected to the power line to emulate an impedance of an incandescent light during a power stage set-up time during which no current is supplied to the LED array. The cold filament test circuit 222 can be employed in conventional signals to verify if a filament of the incandescent lamp is open or not. In this manner, the system controller can supply the lamp for 2 ms to check the lamp current. Since 2 ms is too short for an incandescent lamp to radiate light this approach is sufficient to validate its status. The same test may be performed on the LED array 120.

In one embodiment, when power is applied to the PSU 110 the input current is monitored. After the application of the input voltage the current must be greater than a pre-determined value, otherwise the test fails. The load current of the cold filament test circuit 222 combined with the dummy load current and the inrush current of the input power supply filter capacitor during turn-on provides the necessary current at lower turn-on voltage. In normal operation during turn-on, the cold filament test circuit 222 stays enabled until twenty percent of the LED current is reached. Then, the cold filament test circuit 222 is disabled.

A start-up circuit 220 has an input connected to the input controlled switch 218 and an output connected to the control circuit for starting up the module. In one embodiment, the start-up circuit 220 is a switch-mode boost converter that uses the voltage across the capacitor to generate a reference voltage. The duty cycle is constant and set to get an output voltage necessary for the PWM for a predetermined minimum input voltage. As an example, a pulse width modulator (PWM) needs 15V to start up. The start-up circuit 220 stays enabled until twenty percent of the current delivered to the LED array 120 is reached.

A bleeder circuit 230 is coupled between the control component 208 and the LED array 120. The bleeder circuit 230 is coupled between the control circuit 208 and the LED array 120 to shorten the delay between power down initiation and shut down of the LED array 120. The bleeder circuit 230 can utilize a peak voltage detector to monitor the switching waveform voltage of a transformer. At turn-off, the switching waveform voltage can be eliminated wherein a resistor (e.g., 1 Kohm) is shunted across an output capacitor to force an accelerated power discharge (e.g., less than 75 msec). Without the bleeder circuit 230, power to the LEDs load 120 would discharge at a constant rate established by the characteristic $V_F$–$I_F$ of the LEDs down to a minimum voltage level. In this manner, upon turn off the LEDs will not continue to emit light after turn off.

A control circuit 208 allows the flyback transformer 204 to deliver and regulate the power to the LED array. An output over voltage protection circuit 224 receives an input from the control circuit 208 to activate the safeguarding circuit 212 if the power line voltage is greater than a predetermined threshold. A flyback power switch 206 regulates power output from the flyback transformer 204 to the LED array 120 based on input from the control circuit 208.

An output filter component 232 receives input from the flyback transformer 204 to the LED array 120. The output filter 232 filters power delivered from the flyback transformer 204 to the LED array 120. In this manner, the output filter 232 provides protection against output current ripple.

The input line current is monitored by the light out detection circuit 226 that monitors whether the LED array is functional. The tricolor power signal 100 module detects a light out condition if the LEDs current is below a predetermined value. The PSU 110 regulates the current delivered to the LED array 120 to maintain constant light intensity. The flyback transformer 204 provides output constant power and assuming that the internal losses are almost constant for different input voltage conditions, it could be assumed that the input power delivered to the PSU 110 is constant. Having a constant input power, the line current amplitude is higher at a lower input voltage and lower at a higher input voltage. In terms of input impedance, the PSU 18 has a negative slope resistance.

A dummy load resistor 236 can be added across the input power line to cancel out the negative slope effect of the PSU's 110 input impedance. The input controlled switch 218 isolates the dummy load 236 when the PSU 110 is off. In this manner, the power drawn by the LED array 120 is supplemented via the dummy load 236 to emulate the power of an incandescent signal. Such current draw will therefore trigger the same threshold levels as the original control system thereby eliminating the need to reconfigure the legacy control system.

A dummy load detection circuit 210 can be employed to verify that the dummy load is drawing an appropriate current level according to one or more predetermined thresholds. The dummy load detection circuit 210 receives an input from the dummy load 236 and provides an output to the safeguarding circuit 212 if an error condition exists to discontinue power delivery to the PSU 110. The addition of the dummy load 236 and the dummy load detection circuit 210 can allow the design to avoid being downgraded by AREMA-specified controller (or equivalent) due to variation in input current from an incandescent signal to an LED signal.

An LED current sense feedback circuit 228 can be employed to verify that the current drawn by the LED array 120 is within acceptable operating parameters. If the current is below a predetermined threshold, the safeguarding circuit 212 can be activated to disable power delivery when the current of the LED array 120 reaches a predetermined current level. In one example, the LED current sense feedback circuit 228 disables the safeguarding circuit 212, when the LED current goes below a predetermined threshold. If the LED current does not reach a predetermined threshold within a predetermined time delay, then the safeguarding circuit 212 blows out a fuse and the PSU 110 turns off.

Alternatively or in addition, a light output detection circuit 226 can monitor light output by the LED array 120. The light output detection circuit 226 can be connected between the LED load 120 and the safeguarding circuit 212 wherein the light out detection circuit 226 is activated when the light output is below a predetermined threshold. An optical element such as a CCD array can be utilized to monitor the light output of the LED array 120.

The above control circuitry can mitigate potential hazard situations that may occur. Some situations can include an undetectable dark lamp, flashing in steady mode, a lamp which is perceived to be lit as steady when it should be perceived as flashing and/or immunity to SSC's check pulses (e.g., 16V, 2 ms pulses).

Figure 3:
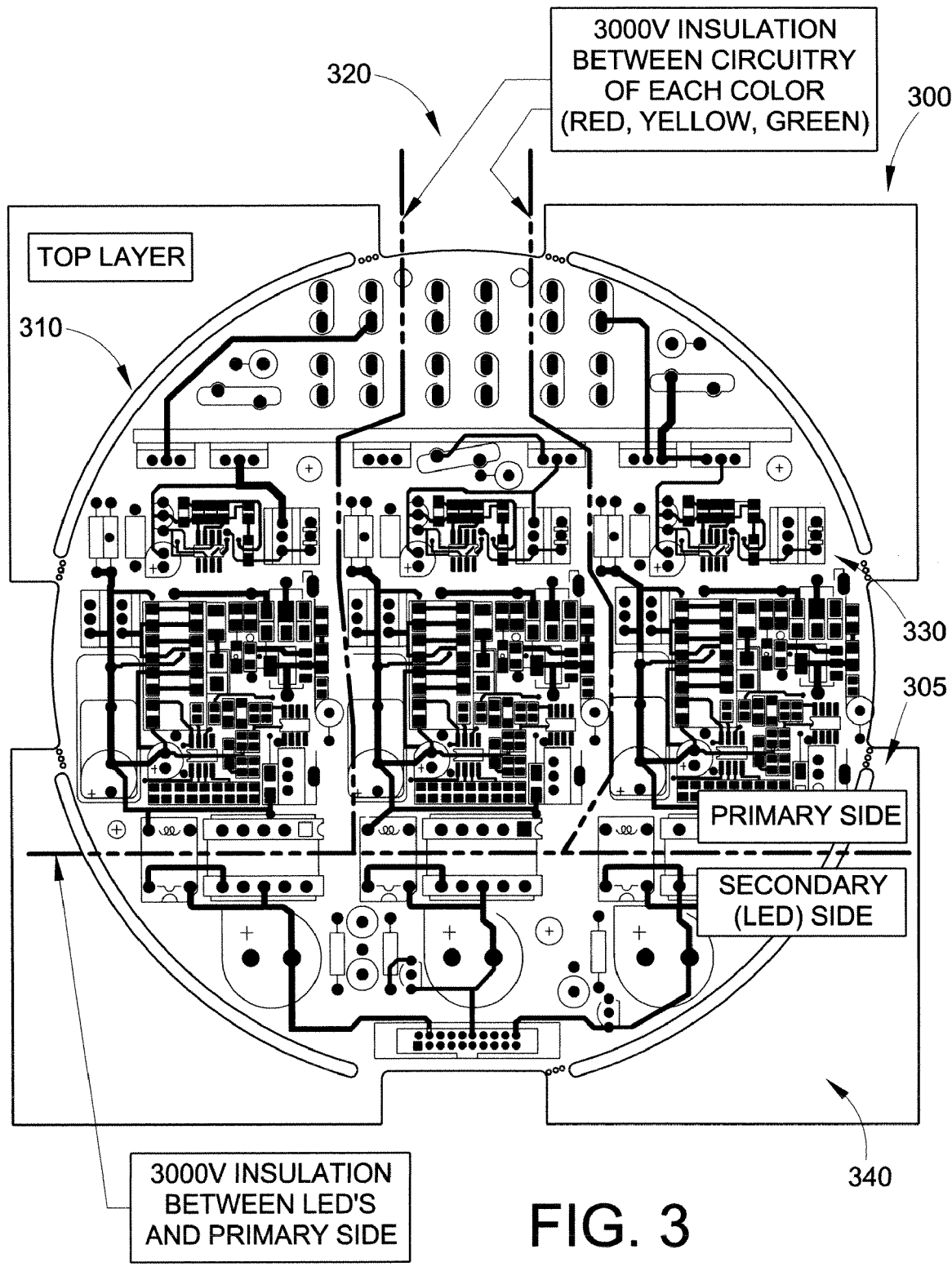
FIG. 3 illustrates a top layer schematic of the LED tricolor power signal, in accordance with an aspect of the subject invention.

FIG. 3 illustrates a top layer 300 of a PCB stack that is employed to implement the tricolor power signal 100. The top layer includes a primary side 305 and a secondary side 340. The primary side 305 includes the power supply unit 110 and the secondary side 340 includes the LED array 120. The power supply unit 110 for the LED array 120 includes one for each of a red LED group 310, a yellow LED group 320 and a green LED group 330 and are included in the primary side 305. As shown, the primary side 305 is insulated from the secondary side 340 by a minimum of 3 kV.

Figure 4:
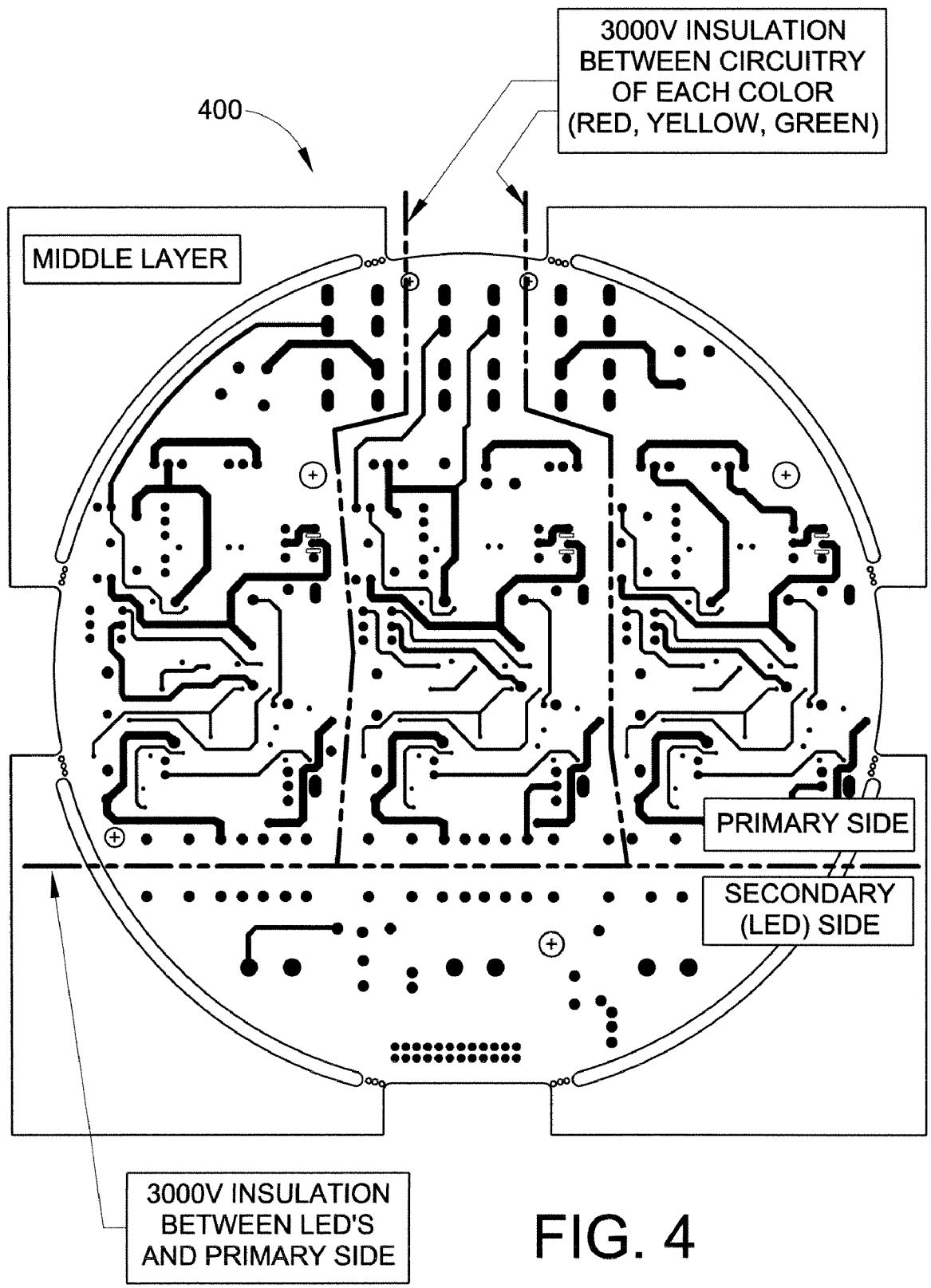
FIG. 4 illustrates a middle layer schematic of the LED tricolor power signal, in accordance with an aspect of the subject invention.
Figure 5:
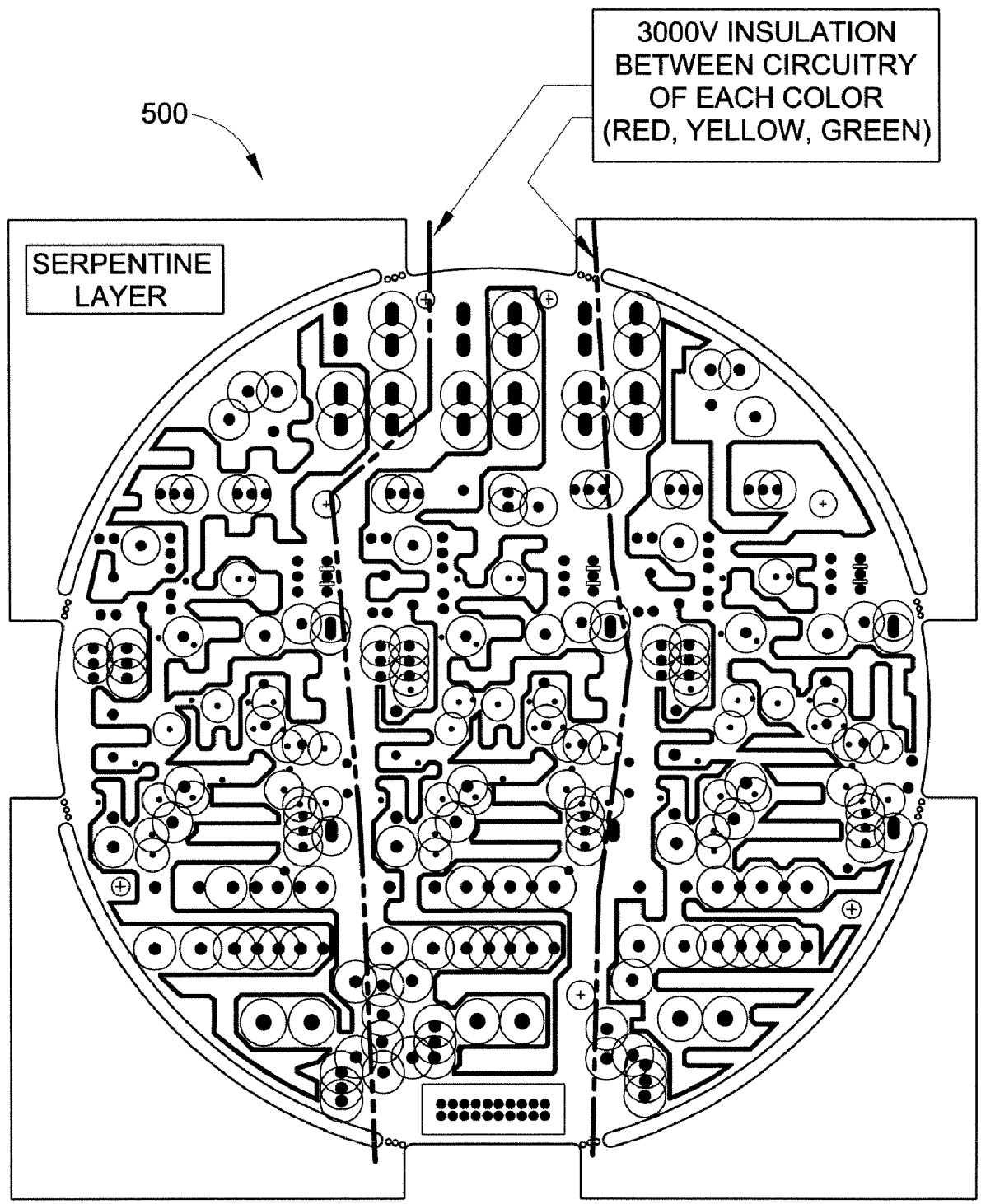
FIG. 5 illustrates a serpentine layer schematic of the LED tricolor power signal, in accordance with an aspect of the subject invention.
Figure 6:
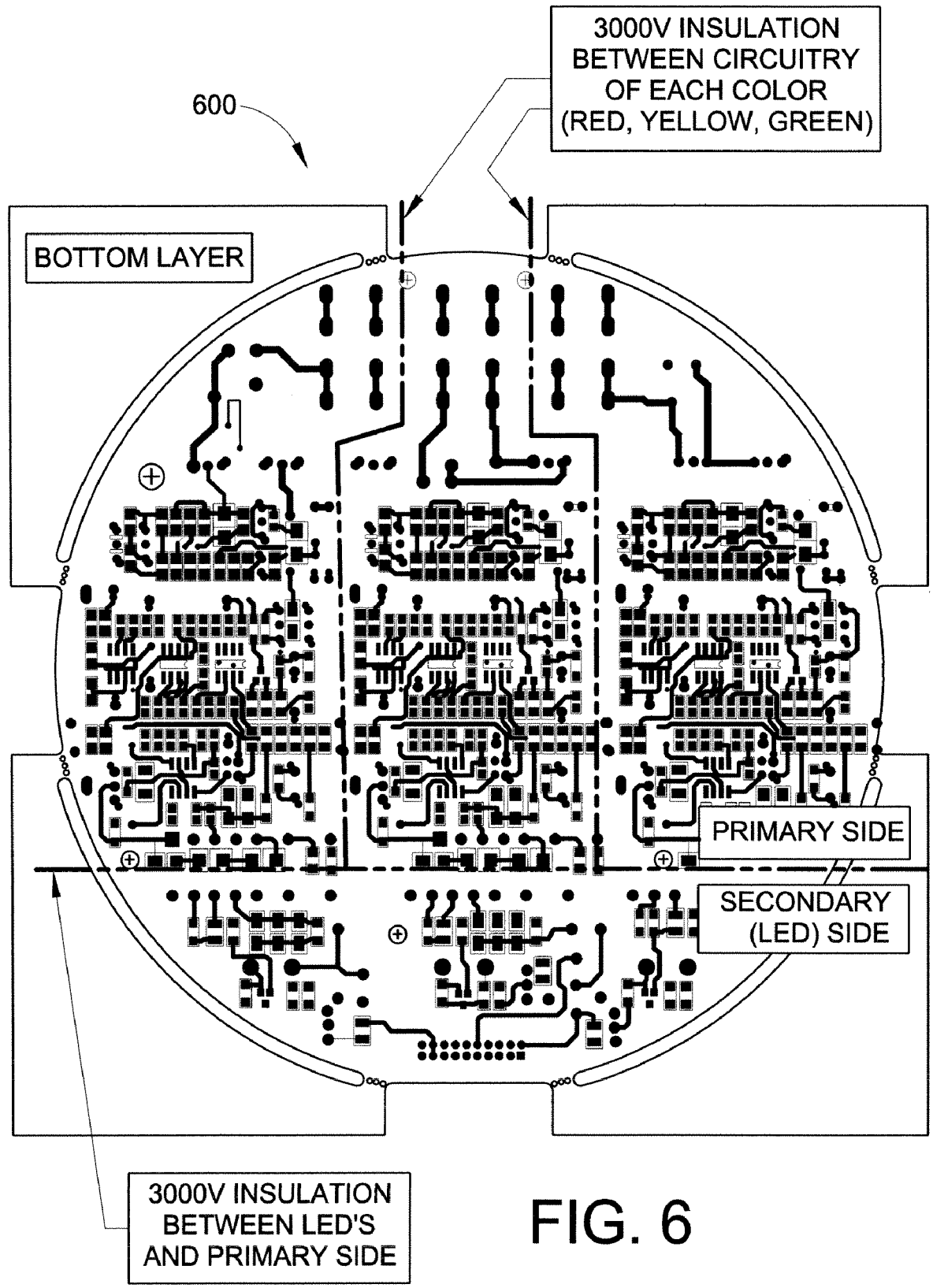
FIG. 6 illustrates a bottom layer schematic of the LED tricolor power signal, in accordance with an aspect of the subject invention.

FIGS. 4, 5, and 6 illustrate a middle layer 400, a serpentine layer 500 and a bottom layer 600 respectively of the tricolor power signal 100. The layers can be stacked from top to bottom with layer 300 on top and layers 400, 500, and 600 stacked consecutively underneath 300. As noted above, the serpentine layer 500 can be employed to disable power to the tricolor power signal 100 if physical damage occurs. This safety measure is equivalent to blowing a fuse to ensure detection of a dark signal in such a case.

Figure 7:
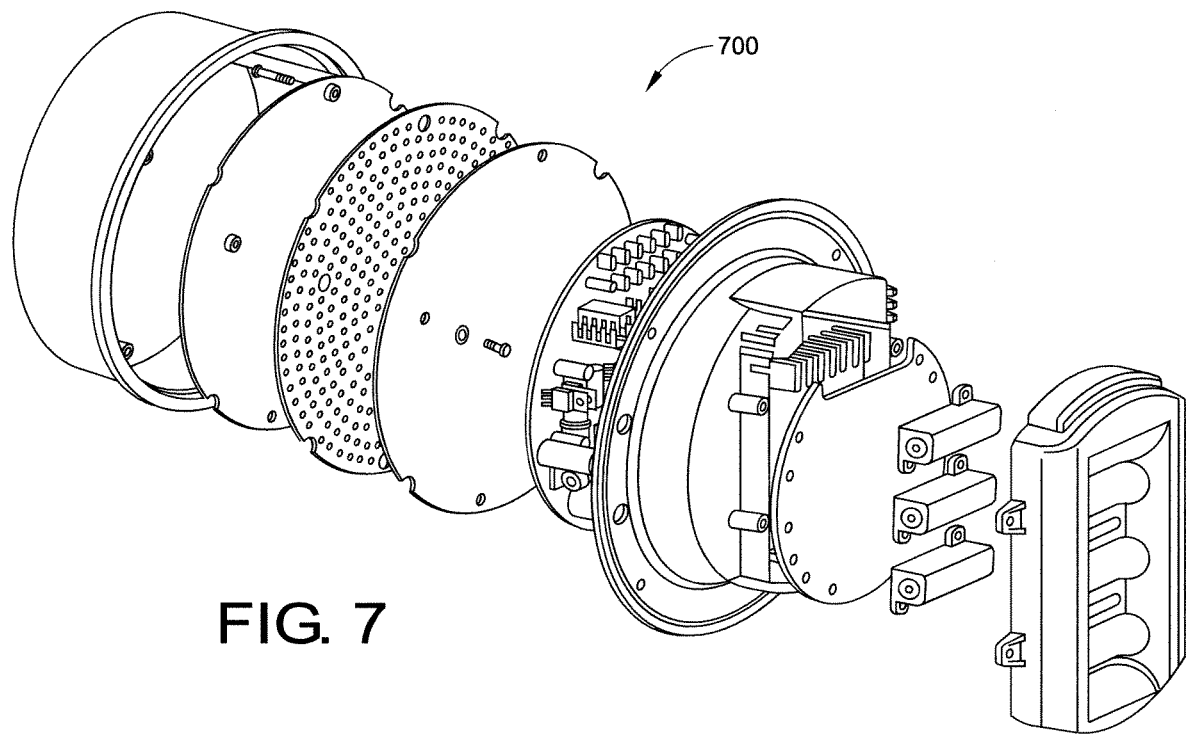
FIG. 7 illustrates a rear view of the LED tricolor power signal sub assembly, in accordance with an aspect of the subject invention.
Figure 8:
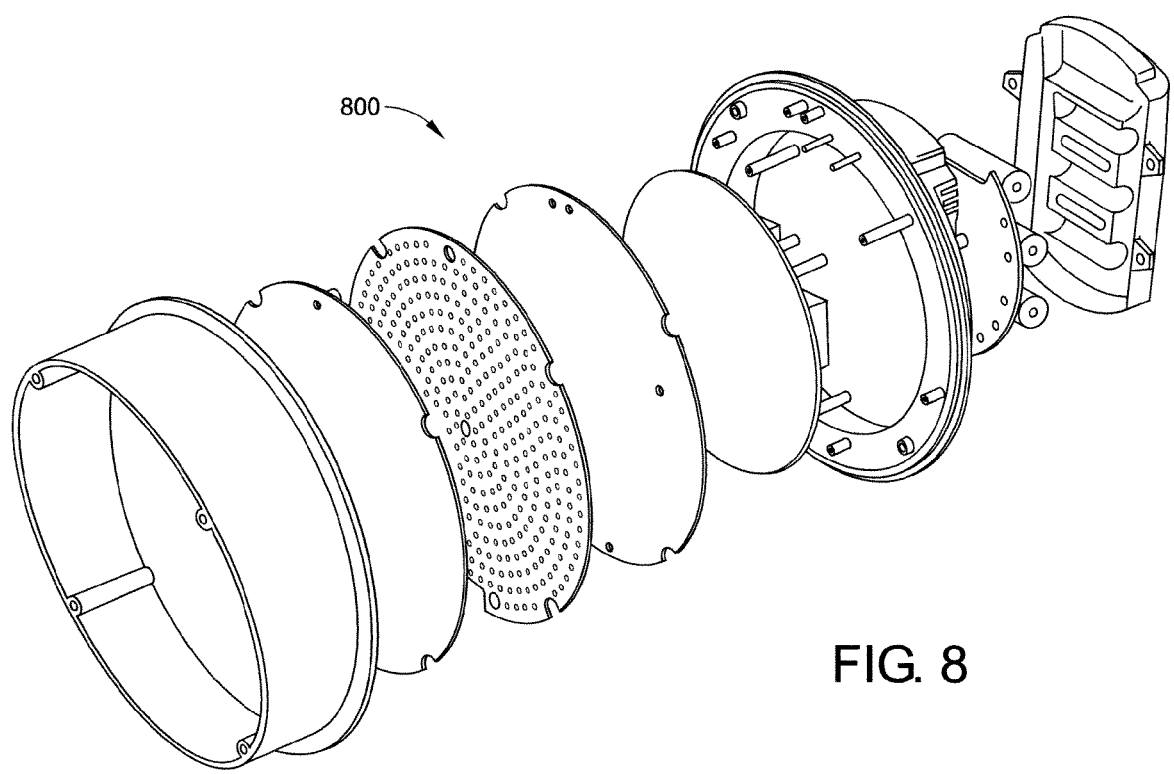
FIG. 8 illustrates a front view of the LED tricolor power signal sub assembly, in accordance with an aspect of the subject invention.
Figure 9:
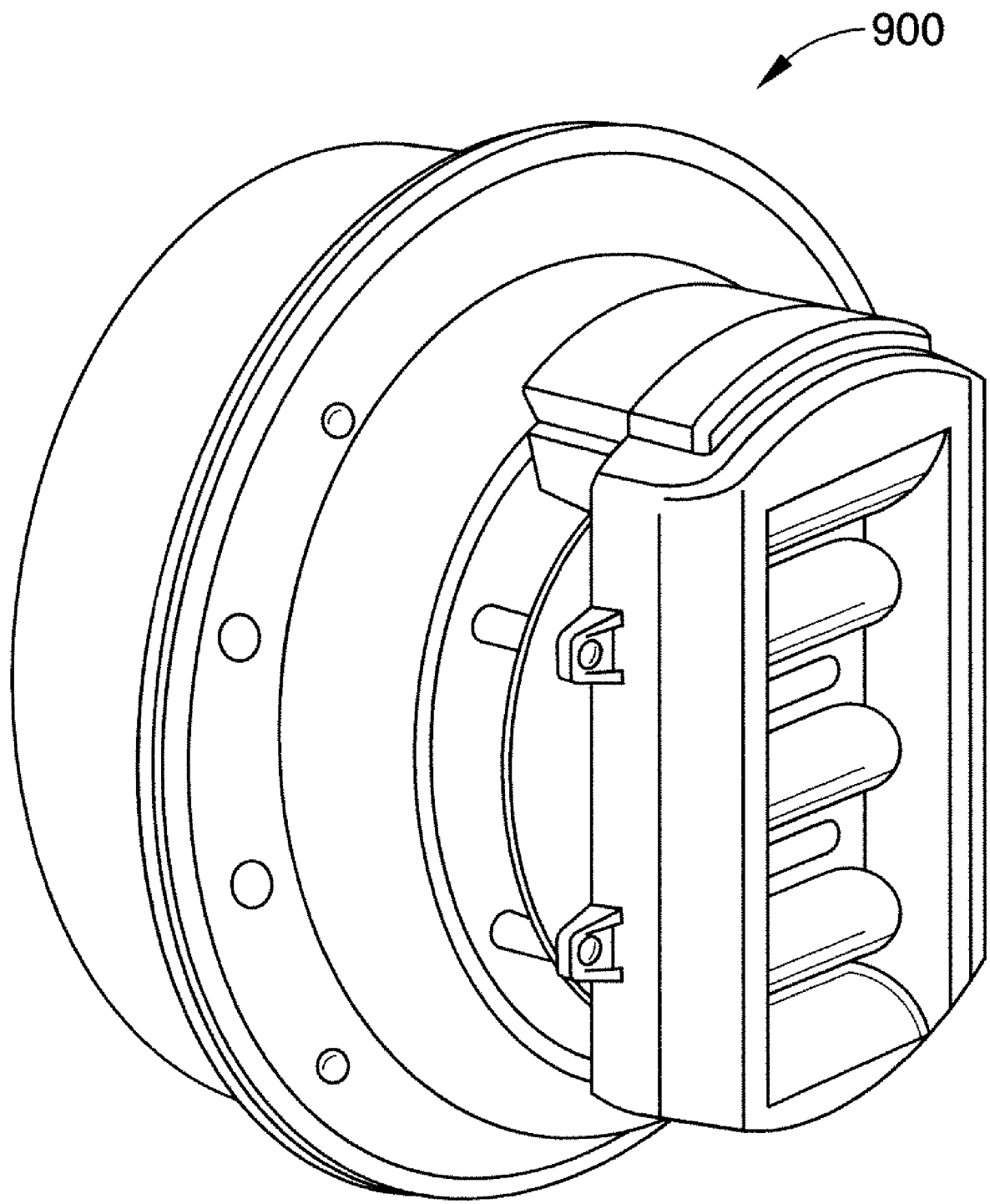
FIG. 9 illustrates a dummy load of the LED tricolor power signal sub assembly, in accordance with an aspect of the subject invention.

FIGS. 7, 8, and 9 illustrate a rear exploded view 700, a front exploded view 800, and a rear isometric view 900 of the tricolor power signal 100. As shown in FIG. 9, back assembly of the tricolor power signal 100 can insure water tightness, dielectric clearance and ease of assembly. One or more gaskets (not shown) can be employed to prevent exposure of the electrical connections to water or particulate matter.

In addition, the dummy loads can be arranged in a parallel configuration, as shown, to ease assembly and to insure that no accidental contact with dummy load terminals occurs. The location of the power supplies for each of the three LED groups can be designed in accordance with safety recommendations from AREMA related to vital trace spacing. Moreover, the circuit as described herein does not have a single point of failure to provide a more robust design than conventional means.

The PSU 110 has very quick input current time response to make signal compatible to substantially any automotive, rail, ship traffic and illumination controller specified by AREMA, ITE or specified by European standards. Moreover, the PSU 110 is designed in such a manner that one cannot misconnect the colors. A unique output connector (e.g., 12-pin) can be keyed to insure that only one interface orientation is possible.

As known, high voltage lines in close proximity can induce current between lines (e.g., a powered line to a non-powered line). In such case, more than one LED group can be illuminated at a time. To prevent this, output insulation between the three separate circuits is employed to prevent any residual voltage from lighting the wrong color. The PSU 110 layout includes an insulated converter in order to insulate electrically the three different colors, even if the LED board itself is not insulated against 3 kV.

The PSU 110 layout is arranged in such a manner as to avoid any of the IC's having single point failures. In this manner, whatever the failure on the IC, the consequence will never be a simultaneous deactivation of the safety circuit and/or erroneous lighting of the LED array. The PSU 110 is designed such that the safeguarding circuit 212 is always active, whatever the failures. In addition or alternatively, sun phantom reduction devices can be utilized in accordance with the tricolor power signal 100.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A signal that provides light output for automotive, rail, ship traffic and/or illumination control, comprising:
    a light emitting diode (LED) array, wherein the LED array includes three groups of disparate colored LEDs; and
    a power supply unit that provides independent power to each of the three LED groups, for each LED group the power supply unit includes,
        an input controlled switch connected to a power line to provide power to the LED array;
        an input under voltage/over voltage circuit for monitoring the voltage level of the power line and for enabling and/or disabling the input controlled switch according to the voltage level of the power line;
        a flyback transformer that converts the power received from the power line from an alternating or a continuous current signal to a direct current signal output to the LED array;
        a dummy load that draws power additional to the LED array;
        a dummy load detection circuit that monitors the dummy load to insure that the power drawn by the load is greater than or equal to a predetermined threshold; and
        a light out detection circuit that monitors the light output of the LED array via an optical sensor.

2. The signal according to claim 1, further including:
    a safeguarding circuit having a fuse through which the input controlled switch circuit is controlled, the safeguarding circuit blows out the fuse to disable the input controlled switch circuit if no current flows through the LED array after a predetermined time when the input controlled switch circuit is activated and/or the light out detection circuit detects less than a predetermined threshold light output.

3. The signal according to claim 1, further including:
a serpentine trace connected in series with the fuse of the safeguarding circuit for disabling the input controlled switch circuit upon physical damage to the signal.

4. The signal according to claim 1, wherein at least 3000 volts of insulation is provided between each input power supply.

5. The signal according to claim 1, further including:
a control circuit that regulates the main flyback power switch to deliver power at predetermined level to the LED.

6. The signal according to claim 5, further including:
a bleeder circuit coupled between the control circuit and the LED array to force an accelerated LED power discharge after power supply turn off is initiated, the bleeder circuit includes a peak voltage detector to monitor a switching waveform voltage of a transformer such that at signal turn-off, the switching waveform voltage is eliminated, wherein a resistor is shunted across an output capacitor.

7. The signal according to claim 1, further including:
a current detection circuit for detecting a current supplied to the LED array to disable the signal through the safeguarding circuit when the current of the LED array reaches a predetermined level.

8. The signal according to claim 1, wherein light output detection circuit disables the signal via the safeguarding circuit when the light output of the LED array reaches a predetermined level.

9. The signal according to claim 7, further including:
an input filter that filters the power line input to the power supply unit to protect from at least one of an internal overload, an input voltage reverse polarity and a line voltage surge; and
an output filter that filters the power delivered from the flyback transformer to the LED array.

10. The signal according to claim 5, further including:
a start-up circuit having an input connected to the input controlled switch and an output connected to the control circuit for starting up the module.

11. The signal according to claim 5, further including:
an input overvoltage protection circuit that monitors the input line voltage to activate the controlled circuit switch if the input line voltage is greater than a predetermined threshold; and
an output overvoltage protection circuit that receives an input from the control circuit to activate the safeguarding circuit if the LED output voltage is greater than a predetermined threshold.

12. The signal according to claim 1, further including:
a cold filament test circuit that is connected to the power line to emulate an impedance of an incandescent light during a power stage set-up time during which no current is supplied to the LED array.

13. The signal according to claim 1, further including:
a single twelve-pin connector that provides input power to the power supply unit, wherein six pins deliver power to the LEDs in each LED group and six pins deliver power to the dummy load in each LED group.

14. A tricolor power signal, comprising:
an LED array that comprises three groups of LEDs, wherein each group has a disparate color;
a power supply unit that provides power to each group of the LED array, the power supply unit includes,
an input controlled switch connected to a power line for receiving power to the LED;
an input under voltage/over voltage circuit for monitoring the voltage level of the power line and for enabling/disabling the input controlled switch according to the voltage level of the power line;
a flyback transformer that converts the power line from an alternating or continuous current signal to a direct current signal output to the LED array; and
a monitoring circuit that monitors the power delivered to the LED array via the power supply unit, the monitoring circuit includes,
a light out detection circuit that monitors the light output of the LED array via an optical sensor; and
a current detection circuit for detecting a current supplied to the LED array to disable a safeguarding circuit when the current of the LED array reaches a predetermined current level.

15. The tricolor power signal according to claim 14, further including:
a safeguarding circuit having a fuse through which the input controlled switch circuit is controlled, the safeguarding circuit blows out the fuse to disable the input controlled switch circuit if no current flows through the LED array after a predetermined time when the input controlled switch circuit is activated and/or the light out detection circuit detects less than a predetermined threshold light output; and
an input under voltage circuit that receives an input from the power line via the safeguarding circuit to disable the input controlled switch if the power line voltage is less than a predetermined threshold.

16. The tricolor power signal according to claim 14, further including:
a cold filament test circuit that is connected to the power line to emulate an impedance of an incandescent light during a power stage set-up time during which no current is supplied to the LED array.

17. The tricolor power signal according to claim 14, further including:
a dummy load that draws power additional to the LED array; and
a dummy load detection circuit that monitors the dummy load to insure that the power drawn by the load is greater than or equal to a predetermined threshold.

18. The tricolor power signal according to claim 14, further including:
a control circuit that allows the flyback transformer to regulate power to the LED.

19. The tricolor power signal according to claim 15, further including:
a serpentine trace connected in series with the fuse of the safeguarding circuit for disabling the input controlled switch circuit upon physical damage to the signal.

20. A method of retrofitting a light signal which includes a plurality of signal heads, comprising:
replacing each of the plurality of signal heads with a single head, wherein the single head utilizes an LED array to provide light output, the LED array is comprised of a plurality of groups wherein each group has disparate color to correlate to each head of the light signal;
connecting each group to a power line via an input controlled switch;

monitoring the power line voltage level to enable and disable the signal according to the voltage level of the power line;

drawing power additional to the LED array via a resistive element to simulate power drawn by the light signal;

monitoring light output of the LED array via an optical sensor or LED current sensor; and disabling the input power if no current flows through the LED array after a predetermined time and/or a light output by the LED array is less than a predetermined threshold light output.

* * * * *